United States Patent
Graus et al.

(10) Patent No.: US 6,729,116 B1
(45) Date of Patent: May 4, 2004

(54) HEIGHT ADJUSTMENT APPARATUS AND METHOD

(75) Inventors: George B. Graus, Mebane, NC (US); James C. Keane, Chapel Hill, NC (US); Hiroshi Hojo, Chapel Hill, NC (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/402,549

(22) Filed: Mar. 28, 2003

(51) Int. Cl.[7] .............................................. A01D 34/74
(52) U.S. Cl. ..................................... 56/17.2; 280/43.13
(58) Field of Search ................................ 56/16.5, 16.7, 56/17.2, 17.5, 17.1, 320.1, 320.2, 322, DIG. 3, DIG. 7, DIG. 10; 280/43.13, 43.2, 43.17

(56) References Cited

U.S. PATENT DOCUMENTS

| | | |
|---|---|---|
| 4,942,726 A | 7/1990 | Bowditch |
| 5,065,568 A | 11/1991 | Braun et al. |
| 5,797,252 A | 8/1998 | Goman |
| 5,960,615 A | 10/1999 | Meetze |
| 6,012,274 A | 1/2000 | Eavenson et al. |
| 6,138,444 A | 10/2000 | Torras, Sr. |
| 6,226,966 B1 | 5/2001 | Eavenson et al. |

*Primary Examiner*—Robert E. Pezzuto
(74) *Attorney, Agent, or Firm*—Jenkins, Wilson & Taylor, P.A.

(57) ABSTRACT

An apparatus and method for adjusting the height of a wheel, particularly a caster wheel, in relation to a structure such as a mower deck of a lawnmower includes a frame member, a hollow guide member, a transverse element, and a lever. The frame member is interconnected between one or more caster wheels and the structure. The frame member includes an angled section disposed along an angled adjustment direction. Spaced recesses are formed in the angled section and arranged along the adjustment direction. The guide member and transverse element are attached to the structure. The angled section is slidable through the guide member. The lever is pivotably connected to the transverse element and includes a locking element. By pivoting the lever, the locking element can be brought into engagement with a selected one of the recesses to fix the angled section at a desired position relative to the guide member and thus the height of the structure relative to a ground surface over which the caster wheel or wheels roll.

39 Claims, 6 Drawing Sheets

Fig·1

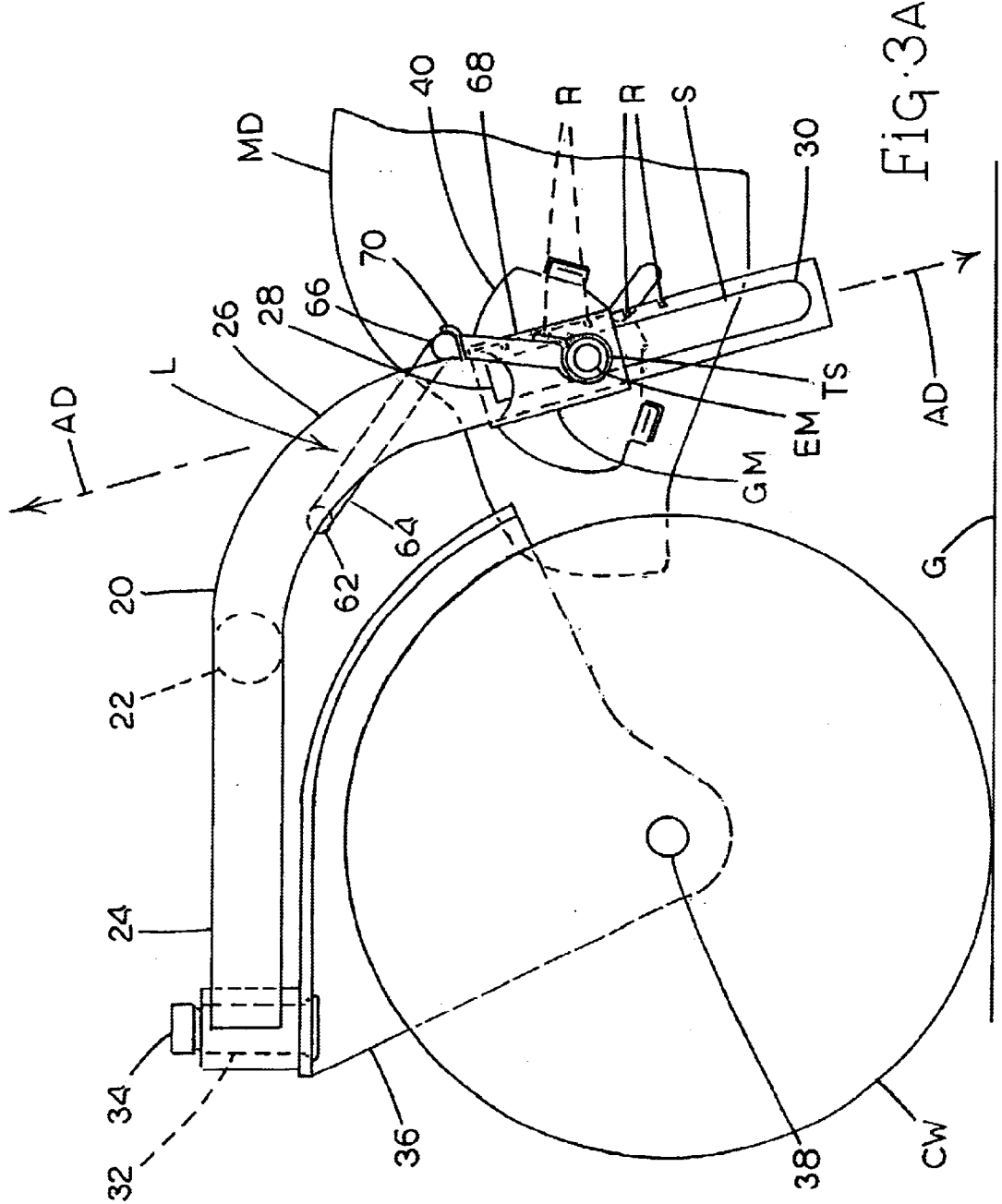

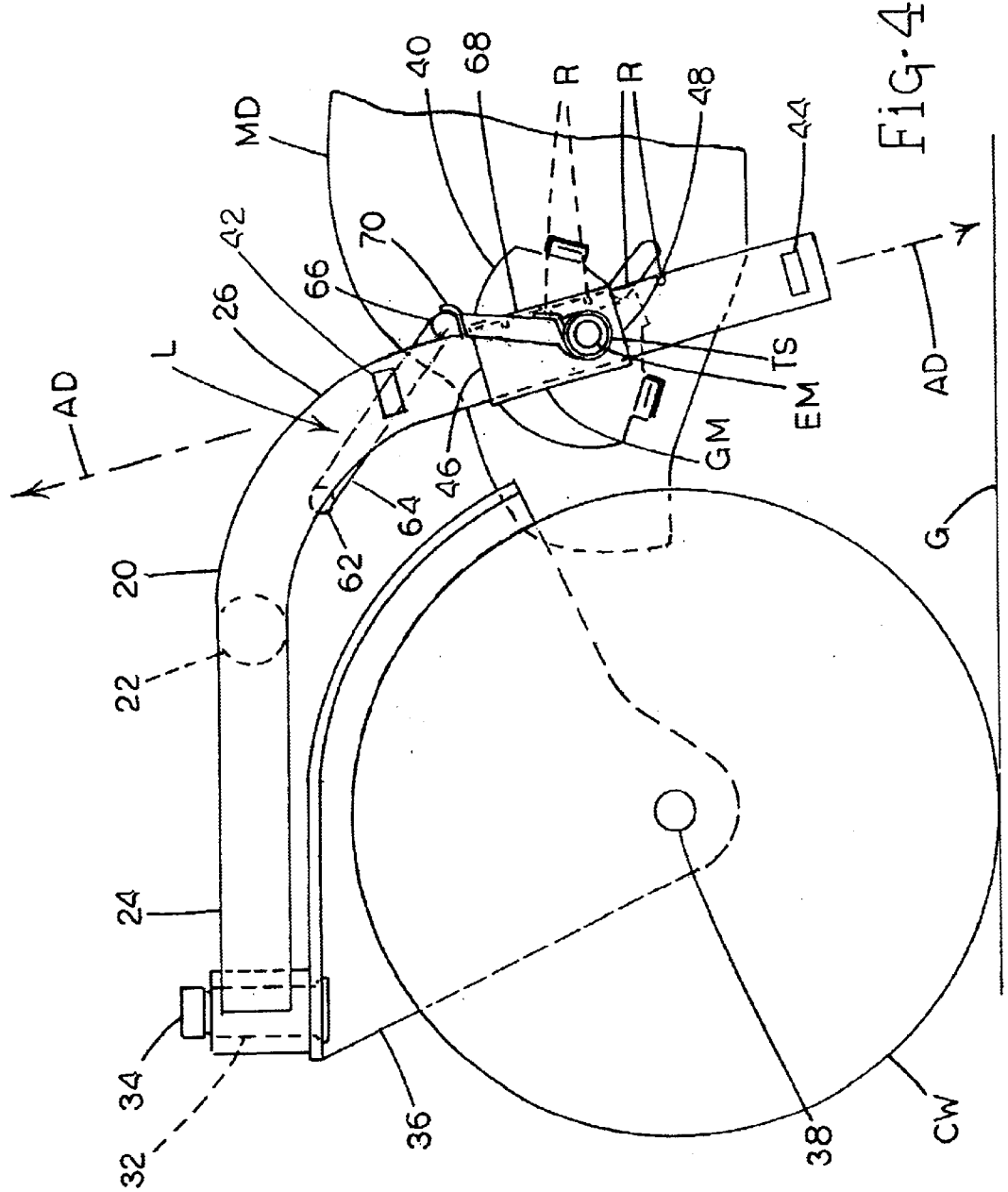

HEIGHT ADJUSTMENT APPARATUS AND METHOD

TECHNICAL FIELD

The present invention generally relates to height adjustment for wheel assemblies, and more particularly to height adjustment in relation to structures utilizing caster wheels. The invention is particularly advantageous as applied to mobile equipment employing caster wheels such as lawnmowers.

BACKGROUND ART

Power equipment such as lawnmowers typically include a set of three or four wheels to support the equipment or a main structure thereof on the ground and to enable the equipment to be rolled along the ground. In the case of lawnmowers, and particularly walk-behind lawnmowers of either the self-propelled or manually pushed type, the main structure for which wheels are provided includes a mower deck to which a motor and cutting blades are mounted. The wheel set often includes one or two front wheels located at the front of the main structure and one or two rear wheels located at the rear of the main structure. Typically, the front and rear wheels are directly coupled to the mower deck, and often are rendered adjustable relative to the mower deck to provide a means by which the height of the mower deck relative to the ground can be adjusted. This height adjustment enables an operator of the lawnmower to cut grass or other vegetation to a desired height.

The means for height adjustment typically constitutes a lever and bracket mounted between each wheel and the mower deck. Adjustment of the lever to a selected position on the bracket, usually by rotating or pivoting the lever to engage a selected notch or aperture of the bracket, changes the angle of the lever relative to the mower deck. The lever is typically interfaced with the mower deck such that changing the angle of the lever changes the angle and spacing of the wheel relative to the mower deck. A lever and bracket can be provided for each wheel, necessitating the individual adjustment of each wheel to attain a desired, level height of the entire mower deck relative to the ground. In the case of a pair of front or rear wheels interconnected by a common axle, a similar means for adjusting the axle position relative to the mower deck can be implemented to adjust both front or rear wheels simultaneously.

In some lawnmowers, the front or rear wheels are provided in the form of caster wheels to improve maneuverability of the lawnmower. For three-wheel lawnmowers, one end (i.e., front or back) of the mower deck includes a pair of fixed-position wheels while the opposite end includes a single caster wheel. For four-wheel lawnmowers, a pair of caster wheels is usually mounted at the front of the mower deck and a pair of fixed-position wheels is mounted at the rear. For instance, a lawnmower equipped with one or two front-mounted caster wheels can be easily steered or turned left or right without having to first lift the front of the mower deck and front wheels off the ground, and without having to drag fixed-position wheels along the ground. As is appreciated by persons skilled in that art, a caster wheels, the caster wheel rotates about the horizontal axis that is generally axis of rotation and a horizontal rolling axis of rotation. Like fixed-position wheels, the caster wheel rotates about the horizontal axis that is generally parallel with the ground, enabling the lawnmower to be rolled forwardly or backwardly along the ground. Unlike fixed-position wheels, however, the caster wheel additionally rotates about the vertical axis, i.e., an axis perpendicular or substantially perpendicular to the ground that allows the caster wheel to be steered or swiveled, thereby enabling the rolling direction of the lawnmower to be changed to the left or to the right.

As is appreciated by persons skilled in the art, in order for a caster wheel-equipped lawnmower to be steered or turned properly, the verticality of the swivel axis of each caster wheel must be maintained. This limitation poses challenges to successfully rendering a caster wheel adjustable relative to mower deck height or, equivalently, rendering a mower deck adjustable relative to caster wheel height. For instance, a conventional lever that changes the angle between a wheel and a deck is unsuitable for use with a caster wheel, since such a lever would cause the swivel axis to deviate from the vertical and impair or even defeat the ability of the caster wheel or wheels to render the lawnmower steerable.

Accordingly, the adjustment means for a caster wheel is preferably designed to adjust the height of the horizontal rolling axis of the caster wheel, without altering the vertical orientation of its swivel axis. In the past, height adjustment for caster wheels has been addressed in a number of ways that have required undue complexity in terms of mechanical design, the use of tools, and/or an excessive expenditure of time. The difficulty presented in providing height-adjustable caster wheels is demonstrated by systems disclosed in the prior art. For example, in one known height-adjustment system, each caster wheel must be locked to prevent rotation and then adjusted individually through a traditional lever and bracket arrangement. In another known system, each wheel must be unbolted from the mower deck and then rebolted into new holes of the mower deck.

In another example, U.S. Pat. No. 4,942,726 to Bowditch discloses a lawnmower with two front-mounted, height-adjustable caster wheels. A pivotable lever is mounted on one side of the adjacent to the lever is a vertical plate that is provided with a series of notches. A pin extending transversely from the lever engages one of the notches to fix the lever in position and thus fix the height of the caster wheels relative to the mower deck. To adjust the height of the caster wheels relative to the mower deck, the lever is pivoted so as to move its pin into engagement with one of the notches of the vertical plate. The arrangement of the lever interfaced with the notched vertical plate is similar to conventional means for adjusting the height of fixed-position wheels, and is characterized by similar disadvantages. For lawnmowers of typical size and weight, the operator must use one hand to lift the mower deck to support its weight while using the other hand to operate the lever. Because the lever and associated vertical bracket are located at one side of the mower deck and operate to adjust both caster wheels simultaneously, the weight of the mower deck must be balanced while forcefully moving the lever from one notch of the bracket to another notch. Moreover, the protruding, exposed structure of the lever renders the lever susceptible to being jarred or knocked out of engagement with the desired notch and into re-engagement with a new notch, with the result that the mower deck is unintentionally adjusted to an undesired height during operation and out of agreement with the height relative to the other wheels. This problem has conventionally been addressed by constructing the lever from a stiff spring material that requires additional effort to be adjusted from one notch to another notch, further necessitating the use of both hands or otherwise increasing the effort required for effecting height adjustment of the caster wheels.

In U.S. Pat. No. 5,065,568 to Braun et al., a lawnmower with two front-mounted, height-adjustable caster wheels is disclosed in which a single crank handle mechanism mounted centrally at the front of the mower deck operates to adjust the height of the entire mower deck relative to both the caster wheels and the rear fixed-position wheels. The interface between the caster wheels, the crank handle mechanism, and the mower deck consists of an elaborate assembly including a transverse bar, hook brackets, push arms, a vertical rear plate, a tie rod, a central arm, a central linkage assembly, and a bell crank. To adjust the height of the caster wheels relative to the mower deck, the crank handle mechanism is turned by the operator, causing a number of interactions among the various afore-mentioned components and resulting in the raising or lowering of the mower deck. It can thus be seen that this height adjustment system adds undue complexity, weight, and cost to lawn-mowers.

A much simpler approach to height adjustment of caster wheels for lawnmowers is disclosed in U.S. Pat. No. 5,960,615 to Meetze, in which an L-shaped bracket serves as a frame for supporting a pair of front-mounted caster wheels. Left and right vertically arranged sets of bolt holes are formed in the left and right sides of a vertical section of the L-shaped bracket. Corresponding left and right vertically arranged sets of receiving holes are formed in a front skirt section of the mower deck of the lawnmower. The L-shaped bracket is fixed to the mower deck by inserting a bolt through one of the left bolt holes of the L-shaped bracket and through one of the left receiving holes of the mower deck in alignment with the left bolt hole, and then threading the left bolt through a nut. This procedure is repeated for a bolt inserted through one of the right bolt holes and right receiving holes. To adjust the height of the caster wheels relative to the mower deck, the operator must remove the bolts to detach the L-shaped bracket from the mower deck, align a different pair of left and right bolt holes with a corresponding pair of receiving holes, and then secure the connection by re-inserting the bolts through the selected holes and re-threading the bolts into their respective nuts. This height adjustment system is disadvantageous in that it requires the use of a tool to effect the height adjustment.

In view of the foregoing examples of prior art, an ongoing need remains for providing an apparatus for adjusting the height of wheels, such as caster wheels, relative to a lawnmower or other structure in an efficient manner and with minimal effort, and without the use of tools or a complex system of components.

SUMMARY

According to one embodiment, an apparatus for adjusting the height of a wheel, such as a caster wheel, in relation to a structure comprises a caster wheel rotatable about a vertical axis, a frame member, a hollow guide member, and a lever. The frame member is attached to the caster wheel for connecting the caster wheel to a structure. The frame member comprises an angled section disposed along an adjustment direction oriented at an angle relative to the vertical axis. The angled section comprises one or more recesses along the adjustment direction. The hollow guide member is adapted for attachment to the structure. The guide member is disposed around the angled section and has an interior oriented along the adjustment direction. The angled section is movable through the guide member along the adjustment direction. The lever comprises a locking element for engaging a selected one of the recesses to enable fixation of the angled section at a desired position relative to the guide member.

In one aspect of this embodiment, the angled section comprises first and second stop members axially spaced along the adjustment direction for constraining movement of the angled section through the guide member. The first and second stop members of the angled section can be provided by respective first and second slot ends of a slot formed in the angled section. A transverse element transversely extends through the slot, and is attached to the structure. The lever is pivotably connected to the transverse element. Accordingly, the movement of the angled section through the guide member is limited by the transverse element alternately contacting the first and second slot ends. In another aspect of this embodiment, a groove is formed in the angled section instead of a slot. The transverse element rides along the groove between first and second ends thereof, thereby limiting the movement of the angled section through the guide member. In yet another aspect of this embodiment, the first and second stop members of the angled section comprise first and second stop surfaces protruding from the angled section. Movement of the angled section through the guide member is limited by opposing ends of the guide member contacting the first and second stop surfaces.

According to another embodiment, an apparatus for adjusting the height of a wheel, such as a caster wheel, in relation to a structure comprises a caster wheel rotatable about a vertical axis, a frame member, a hollow guide member, an elongate element, and a lever. The frame member is attached to the caster wheel for connecting the caster wheel to a structure. The frame member comprises an angled section disposed along an adjustment direction oriented at an angle relative to the vertical axis. The angled section comprises a slot disposed along the adjustment direction, and a plurality of spaced recesses serially arranged along the adjustment direction. The hollow guide member is adapted for attachment to the structure. The guide member is disposed around the angled section and has an interior oriented along the adjustment direction. The angled section is movable through the guide member along the adjustment direction. The elongate element transversely extends through the slot, and is alternately contactable with first and second opposing slot ends of the slot. The first and second slot ends limit movement of the angled section relative to the guide member. The lever is pivotably connected to the elongate element and comprises a locking element for engaging a selected one of the recesses to enable fixation of the angled section at a desired position relative to the guide member.

According to yet another embodiment, an apparatus for adjusting the height of a wheel, such as a caster wheel, in relation to a structure comprises first and second caster wheels rotatable about respective parallel vertical axes, first and second frame members, a transverse frame member interconnecting the first and second frame members, first and second hollow guide members, first and second transverse elements, and a lever. The first frame member is attached to the first caster wheel for connecting the first caster wheel to a structure. The first frame member comprises a first angled section disposed along an adjustment direction oriented at an angle relative to the vertical axes. The first angled section comprises a pair of first stop members axially spaced along the adjustment direction, and a plurality of first recesses serially arranged along the adjustment direction. The second frame member is attached to the second caster wheel for connecting the second caster wheel to the structure. The second frame member comprises a second angled section disposed along the adjustment direction. The second angled section comprises a pair of second stop members axially spaced along the adjustment direction, and a plurality of second recesses serially arranged along the adjustment direction. The first and second hollow guide members are adapted for attachment to the structure. Each guide member is disposed around a respective angled section, and has an interior oriented along the adjustment direction. Each angled section is movable through a respective guide member along the adjustment direction. Movement of the angled sections is constrained between the respective pairs of first and second stop members. The first and second transverse elements are adapted for attachment to the structure. The lever is pivotably connected to and extends between the first and second transverse elements. The lever comprises first and second locking elements for respectively engaging a selected first recess and second recess to enable fixation of the first and second angled section at a desired height relative to the first and second guide members.

According to still another embodiment, a mobile apparatus is movable along a ground surface and is adapted for height adjustment relative to the ground surface. The apparatus comprises a set of wheels, a structure supported by the set of wheels, a frame member, a hollow guide member attached to the structure, a transverse element attached to the structure, and a handle. At least one of the wheels is a caster wheel rotatable about a vertical axis. The frame member interconnects the caster wheel and the structure. The frame member comprises an angled section disposed along an adjustment direction oriented at an angle relative to the vertical axis. The angled section comprises first and second stop members axially spaced along the adjustment direction, and a plurality of spaced recesses serially arranged along the adjustment direction. The hollow guide member is disposed around the angled section and has an interior oriented along the adjustment direction. The angled section is movable through the guide member along the adjustment direction. Movement of the angled section is constrained between the first and second stop members. The handle is pivotably connected to the transverse element and comprises a locking element for engaging a selected one of the recesses to enable fixation of a height of the structure relative to the caster wheel.

A method is provided for adjusting the height of a wheel, such as a caster wheel, relative to a structure such as the mower deck of a lawnmower. The caster wheel is supported by a frame that comprises an angled section. The angled section extends through a hollow guide member that is attached to the structure. The guide member and angled section are oriented along an adjustment direction that is angled relative to a ground surface on which the caster wheel is disposed. A lever is initially locked in engagement with a first recess of the angled section. The lever is grasped and pivoted out of engagement with the first recess into an unlocked position, while the lever is used to support a weight of at least a portion of the structure. In the unlocked position, the angled section is freely slidable through the guide member along the adjustment direction. A second recess of the angled section is selected. The second recess is spaced from the first recess at a distance generally along the adjustment direction. The angled section is slid through the guide member to an adjusted position that corresponds to a new height of the caster wheel relative to the structure. The angled section is slid along the adjustment direction by moving the lever along a vertical direction generally perpendicular to the ground surface, thereby raising or lowering the lever and consequently raising or lowering the structure. The angled section is locked at the adjusted position by releasing the lever. The angled orientation of the angled section and guide member, and the weight of at least the portion of the structure, cooperatively cause the lever when released to pivot into locked engagement with the selected second recess. In some embodiments, the pivoting of the lever into engagement with the selected second recess can be assisted through the use of a torsion spring that can be, for example, attached to the lever and wound around an axis about which the lever pivots.

It is therefore an object of the invention to provide a height adjustment apparatus and method for interconnection between one or more wheels, such as caster wheels, and a structure for which height adjustment is desired relative to the wheel or wheels and the ground, without impairing operation of the wheel or wheels.

An object of the invention having been stated hereinabove, and which is achieved in whole or in part by the invention disclosed herein, other objects will become evident as the description proceeds when taken in connection with the accompanying drawings as best described hereinbelow.

BRIEF DESCRIPTION OF THE DRAWINGS

FIG. 3A is a side elevation view of the height adjustment apparatus in a locked position;

FIG. 4 is a side elevation view of the height adjustment apparatus according to an alternative embodiment.

DETAILED DESCRIPTION OF THE INVENTION

Figure 1:
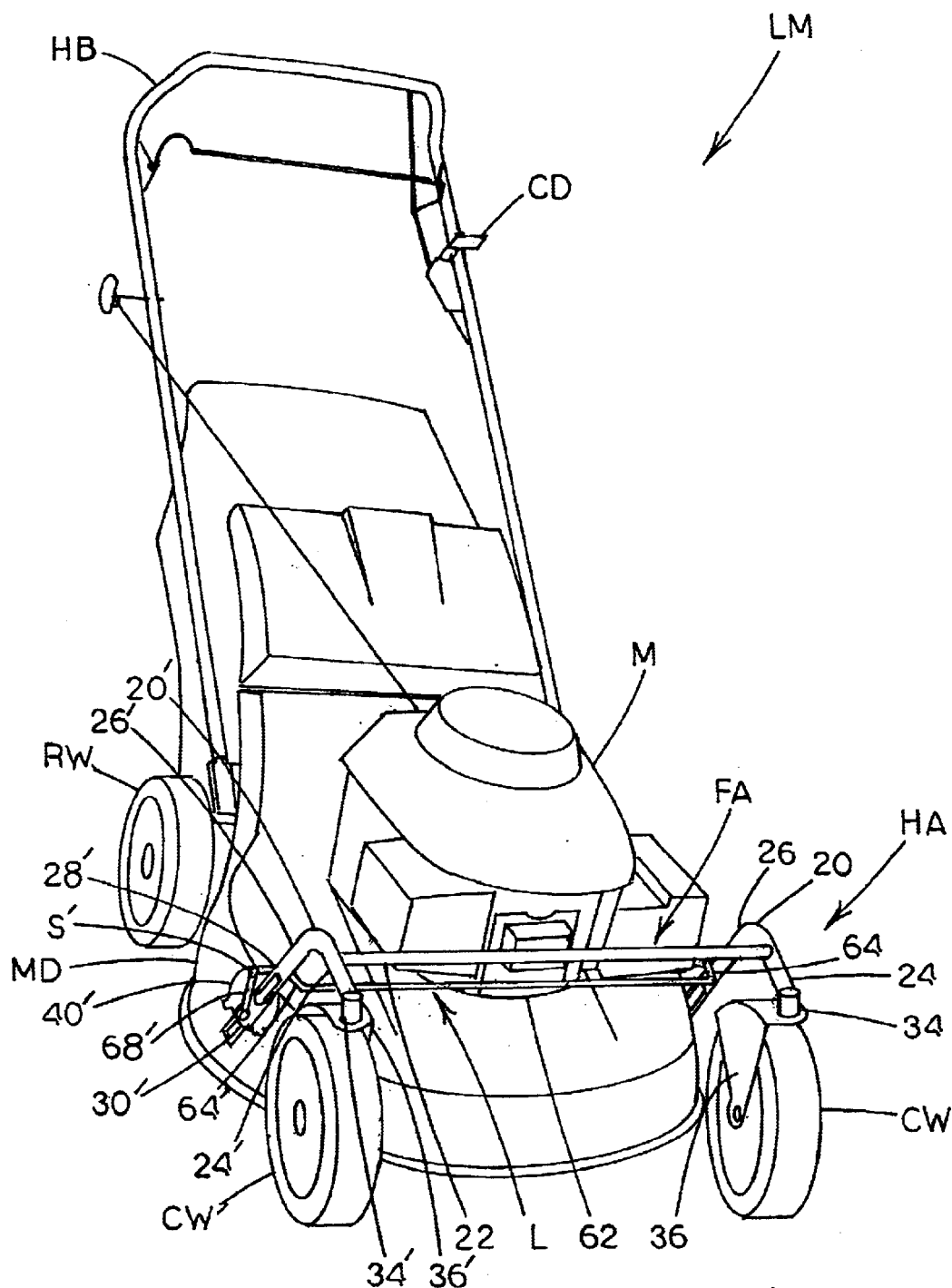
FIG. 1 is a perspective view of a lawnmower equipped with front-mounted caster wheels and a height adjustment apparatus according to an embodiment of the invention.

Referring now to FIG. 1, a mobile apparatus such as a lawnmower, generally designated LM, is illustrated as an example of a device that can benefit from the practice of the invention. Lawnmower LM can have any configuration generally known to persons skilled in the art, and thus the exemplary embodiment illustrated in FIG. 1 will be only briefly described. In the illustrated embodiment, lawnmower LM comprises a mower deck MD on which a motor M such as an internal combustion engine is mounted. Motor M drives the rotation of cutting blades (not shown) disposed within the interior of mower deck MD beneath motor M. Mower deck MD is typically rotatably supported on the ground by a pair of rear-mounted fixed-position wheels RW (only one of which is shown in FIG. 1) and a pair of front-mounted first and second caster wheels CW and CW'. An operator controls lawnmower LM from the rear of mower deck MD by grasping a handlebar HB extending upwardly and rearwardly from mower deck MD, and walking behind mower deck MD as lawnmower LM is operating. Depending on whether lawnmower LM is a manual push-type or is self-propelled, the operator either pushes lawnmower LM forwardly or pulls lawnmower LM rearwardly along a desired cutting path, or uses a handle-mounted control device CD to control whether output power from motor M is coupled to rear wheels RW to drive lawnmower LM in a forward direction. In accordance with the invention, caster wheels CW and CW' are connected to mower deck MD and rendered height-adjustable by a height adjustment apparatus, generally designated HA and described in detail hereinbelow.

It will be understood that lawnmower LM is illustrated in FIG. 1 for the purpose of providing an example of the type of caster wheel-equipped devices, machines, or other structures in which height adjustment apparatus HA can be implemented. Any mobile equipment that could benefit from the use of height-adjustable caster wheels is considered as falling within the scope of the invention. Any wall, housing or other structure could be substituted for mower deck MD illustrated in FIG. 1. Additionally, caster wheels CW and CW' could be located at the rear of mower deck MD or other structure. It is further acknowledged that some types of lawnmowers have a single caster wheel located at the front or rear end of mower deck MD, with a pair of fixed-position wheels being located at the opposite end. Moreover, the type of lawnmower for which height adjustment apparatus HA is provided is not limited to the illustrated walk-behind configuration. Height adjustment apparatus HA could be applied, for instance, to a riding lawnmower in which one or more caster wheels CW and CW' are connected through height adjustment apparatus HA to a front or rear section of the frame or chassis provided with the riding lawnmower.

Figure 2:
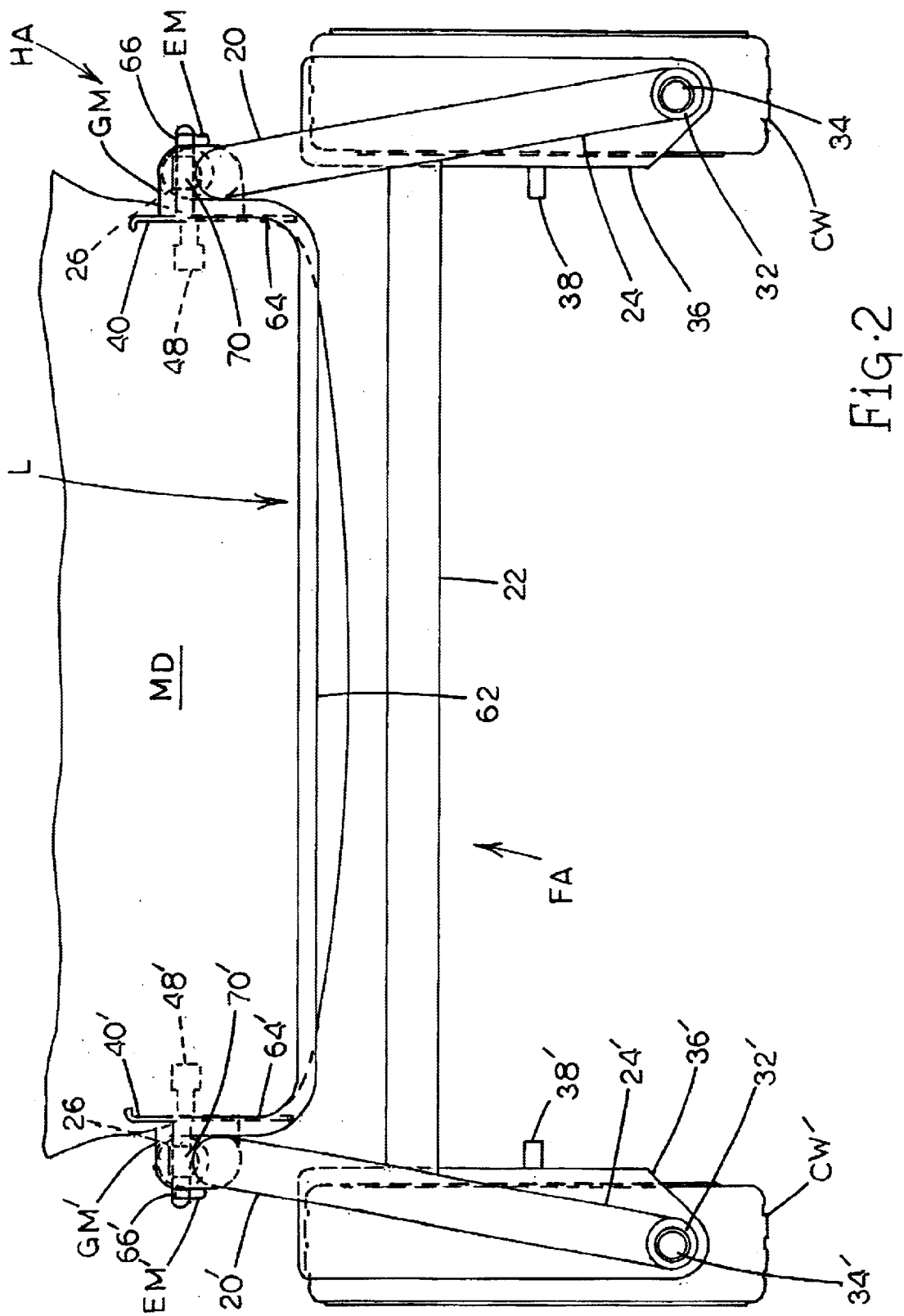
FIG. 2 is a top plan view of the height adjustment apparatus.
Figure 3B:
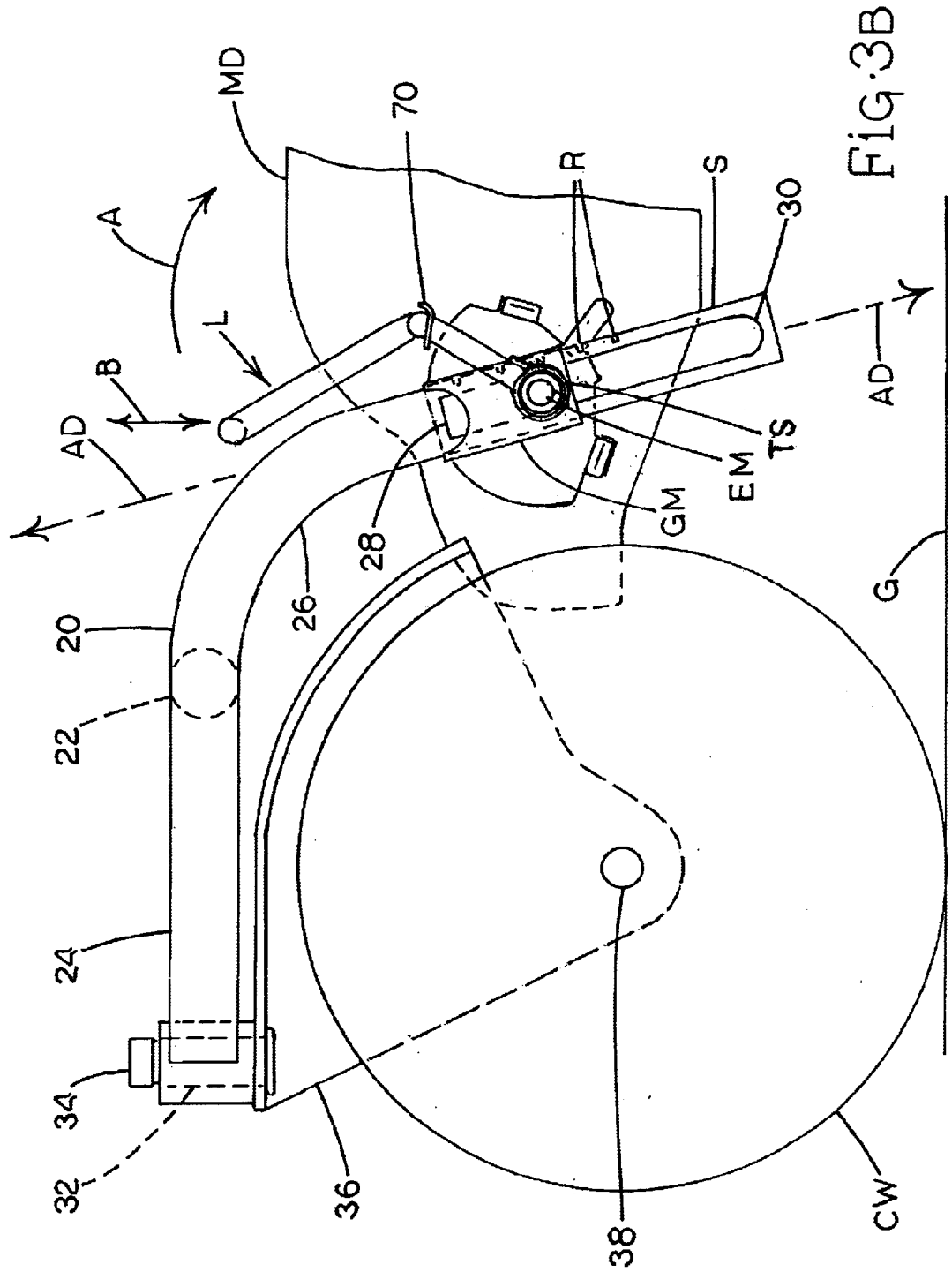
FIG. 3B is a side elevation view of the height adjustment apparatus in an unlocked position.

Referring now to FIGS. 1–3A, the structural details of height adjustment apparatus HA will now be described. It will be noted from FIG. 2 that the arrangement of height adjustment apparatus HA can be substantially symmetrical relative to mower deck MD, and its left- and right-mounted components can be substantially similar. Accordingly, while FIGS. 3A–3C illustrate only first caster wheel CW and primarily the components of height adjustment apparatus HA typically disposed on the side of-mower deck MD nearest to first caster wheel CW, it will be understood that the descriptions set forth herein with reference to FIGS. 3A–3C are generally equally applicable to second caster wheel CW' and those components of height adjustment apparatus HA typically disposed on the other side of mower deck MD nearest to second caster wheel CW'. Accordingly, components disposed on the side of mower deck MD nearest to second caster wheel CW', or otherwise associated with caster wheel CW', are designated herein by the same reference numerals as their counterpart components disposed on the side of mower deck MD nearest to first caster wheel CW, but are additionally designated by the prime symbol ('). Any component designated herein with the prime symbol that is not specifically illustrated in the Figures is considered to be impliedly represented by its counterpart component illustrated in FIGS. 3A–3C.

With continuing reference to FIGS. 1–3A, height adjustment apparatus HA comprises a frame assembly, generally designated FA, that supports first and second caster wheels CW and CW'. Frame assembly FA comprises first and second lateral members 20 and 20' that preferably are interconnected by a cross member 22 to impart rigidity to frame assembly FA. First and second lateral members 20 and 20' comprise respective first and second overhead support sections 24 and 24' and adjoining first and second angled sections 26 and 26' extending from an end of support sections 24 and 24'. Preferably, each support section 24 and 24' is generally horizontally oriented and disposed above its corresponding casterwheel CW and CW', and each adjoining angled section 26 and 26' is disposed rearwardly of its corresponding caster wheel CW and CW', respectively. As shown in FIG. 3A, angled section 26 (and angled section 26', shown in FIG. 1) is disposed along an adjustment direction AD that is oriented at an angle relative to horizontal and vertical directions. As described hereinbelow, angled sections 26 and 26' are movable along adjustment direction AD when height adjustment apparatus HA is in an unlocked state. Support sections 24 and 24' and angled sections 26 and 26' are preferably rectilinear, but can alternately be cylindrical (as illustrated) or have another polygonal shape. In addition, support sections 24 and 24' and angled sections 26 and 26' are preferably hollow to reduce weight and cost.

Referring specifically to FIGS. 1 and 3A, each angled section 26 and 26' defines a respective elongate slot S and S' formed along a length thereof between opposing slot ends 28, 30 and 28', 30' proximate ends opposite from support sections 24 and 24'. Each slot S and S' preferably comprises a pair of opposing slots aligned with each other on the inwardly facing and outwardly facing sides of each angled section 26 and 26', so as to provide a transverse opening through the cross-section of each angled section 26 and 26'. Elongate slots S and S' are oriented generally along the same angled direction as angled section 26 and 26', i.e., along adjustment direction AD. Each angled section 26 and 26' also has a serial arrangement of recesses R and R' such as notches, which likewise are oriented along adjustment direction AD. The invention is not limited to any specific number of recesses or the amount of spacing between adjacent recesses.

First and second overhead support sections 24 and 24' have respective vertically oriented axle bores 32 and 32', attached thereto or formed integrally, through which vertically oriented swivel axles 34 and 34' extend. Swivel axles 34 and 34' are rigidly attached to first and second wheel housings 36 and 36', respectively. Each wheel housing 36 and 36' can have any suitable design, such as a bar, a rod, a plate, or a partial enclosure. First and second caster wheels CW and CW' respectively rotate on horizontal rolling axles 38 and 38' that are fixed respectively to first and second wheel housings 36 and 36'. By this configuration, first and second caster wheels CW and CW' depend from frame assembly FA, and their respective swivel axles 34 and 34' are free to rotate within axle bores 32 and 32' of support sections 24 and 24'. When adjusting the height of first and second caster wheels CW and CW' relative to mower deck MD as described hereinbelow, the verticality of swivel axles 34 and 34' is maintained or at least substantially maintained so as not to impair the successful operation of caster wheels CW and CW'. When the verticality of swivel axles 34 and 34' is maintained, caster wheels CW and CW' can swivel in an unimpeded matter. In addition, the turning circle traced by the point of contact between each caster wheel CW and ground G is coplanar with ground G, and thus the height of mower deck MD relative to ground G is not affected by the swiveling of each caster wheel CW. If, on the other hand, the verticality of swivel axles 34 and 34' were not maintained, the turning circle made by each caster wheel CW would be traced in a plane at an angle to the plane of ground G, which would affect the height of mower deck MD due to the angle of the axis about which caster wheel CW swivels and the radius of each casterwheel CW.

Figure 3C:
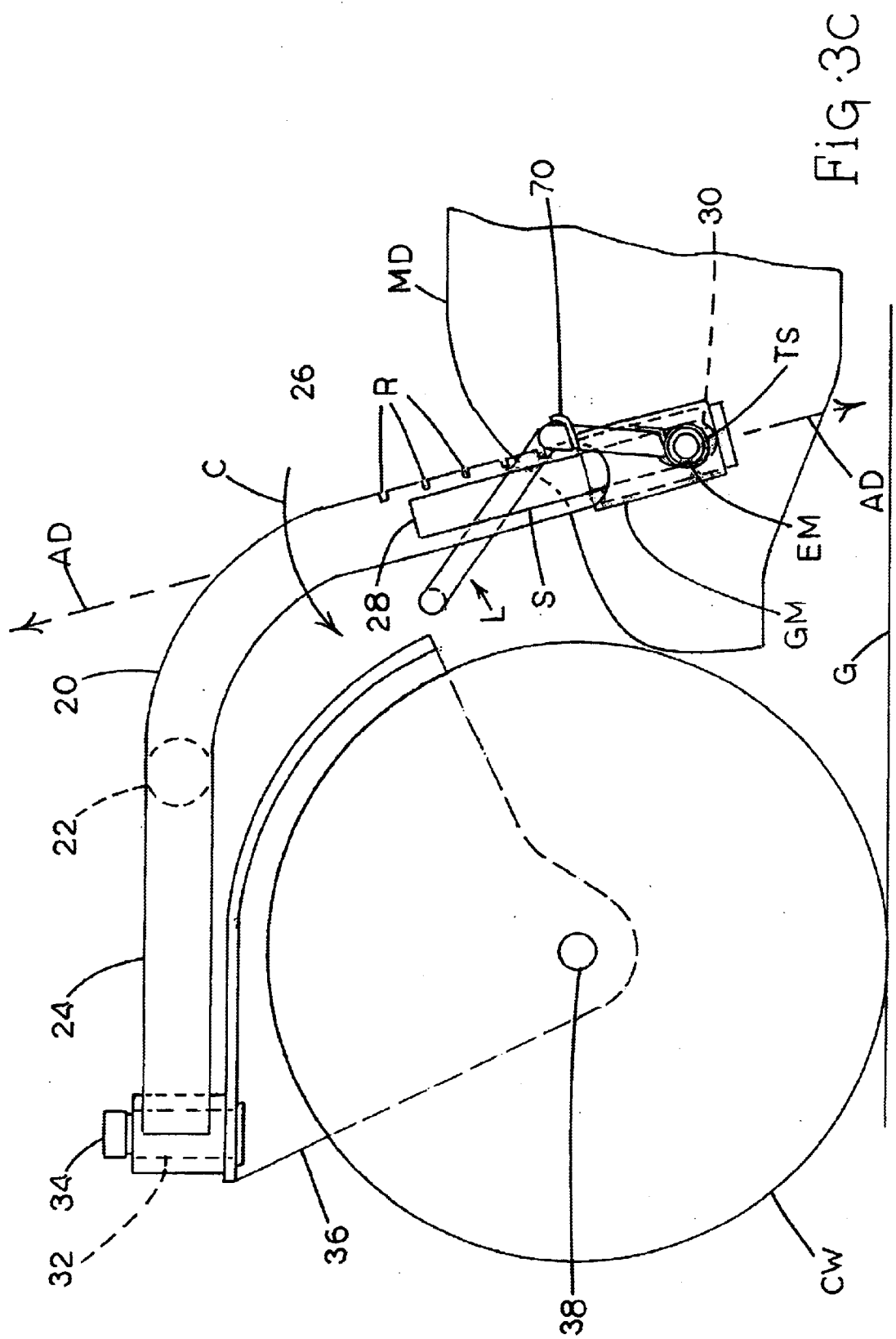
FIG. 3C is a side elevation view of the height adjustment apparatus in a locked position and at a different height setting than that illustrated in FIG. 3A.

Referring to FIGS. 2 and 3A, height adjustment apparatus HA further comprises hollow first and second guide members GM and GM' such as sleeves that are rigidly mounted to each side of mower deck MD. Each guide member GM and GM' can be mounted directly to mower deck MD or alternatively to an intervening adapter or mounting means such as a mounting plate 40 and 40' secured to mower deck MD by bolts, welding, or the like. Any suitable means can be employed to affix first and second guide members GM and GM' to mower deck MD, such as welding or fasteners (for example, screws or bolts and nuts). First and second guide members GM and GM' can be constructed from a suitable metal or from a durable, high-strength polymer having low-friction surfaces. First and second guide members GM and GM' can have any suitable hollow shape, such as the U-shape illustrated in FIG. 2, a cylindrical shape, or the like. First and second guide members GM and GM' are shown mounted to mower deck MD in the same angled orientation as first and second angled sections 26 and 26' of frame assembly FA. As shown in FIGS. 3A–3C, this mounting allows first and second angled sections 26 and 26' to be translated along adjustment direction AD through first and second guide members GM and GM', respectively, and thus first and second guide members GM and GM' are coaxially disposed about first and second angled sections 26 and 26'.

Continuing with FIGS. 2 and 3A, height adjustment apparatus HA additionally comprises first and second transverse elongate members EM and EM' and an adjustment lever or handle, generally designated L, pivotably attached thereto. First and second transverse elongate members EM and EM' can be provided in the form of axles, pins, bolts, or the like. Preferably, first and second transverse elongate members EM and EM' are threaded so as to be secured to mower deck MD by respective nuts 48 and 48' (see FIG. 2). When so threaded, it will be noted that first and second transverse elongate members EM and EM' can serve as the fasteners that secure first and second guide members GM and GM' to mower deck MD. In other embodiments, each guide member GM and GM' could be welded to its respective mounting plate 40 and 40', each guide member GM and GM' could be manufactured as a unitary component with its respective mounting plate 40 and 40', or each guide member GM and GM' could be interlocked with its respective mounting plate 40 and 40' by suitable means such as tabs. Each transverse elongate member EM and EM' extends transversely through a pair of opposing holes (not specifically shown) formed in a corresponding guide member, and through elongate slots S and S' of each angled section 26 and 26' of frame assembly FA. First and second angled sections 26 and 26' are thus movable with respect to first and second guide members GM and GM' and their corresponding transverse elongate members EM and EM'. Elongate slots S and S' and particularly their slot ends 28, 30 and 28', 30' act as stop members to define the outer limits of axial movement of first and second angled sections 26 and 26' along adjustment direction AD.

Alternatively, each elongate slot S and S' and associated pair of slot ends 28, 30 and 28', 30' could instead constitute a groove and opposing groove ends formed in each angled section 26 and 26' along the same angled orientation to function as a stop member limiting the movement of each angled section 26 and 26'. In such a case, transverse elongate members EM and EM' would not need to pass transversely through angled sections 26 and 26', and either a portion of each transverse elongate member EM and EM' or a protruding portion of each guide member GM and GM' would engage each corresponding groove and slide along the axial length of the groove. Referring to FIG. 4, as another alternative, each elongate slot S and S' could be eliminated and respective pairs of slot ends 28, 30 and 28', 30' replaced with pairs of opposing stop surfaces protruding transversely from the outer surface of each angled section 26 and 26'. Thus, FIG. 4 illustrates stop surfaces 42 and 44 protruding from angled section 26. In such a case, the movement of each angled section 26 and 26' through its corresponding guide member GM and GM' would be limited by the encountering of each stop surface 42 and 44 with a corresponding axial end 46 and 48 of guide member GM and GM'.

As shown in FIG. 2, adjustment lever L is shaped so as to extend over or in front of the front section of mower deck MD between first and second caster wheels CW and CW', and toward first and second transverse elongate members EM and EM' for pivotable connection therewith. Thus, in the embodiment illustrated in FIG. 2, adjustment lever L preferably includes a centrally located transverse section 62 that traverses the span of mower deck MD and that transitions rearwardly to first and second side sections 64 and 64'. First and second side sections 64 and 64' in turn transition outwardly to first and second radial sections 66 and 66'. As shown in FIG. 3A, each radial section 66 and 66' transitions downwardly to a respective end section 68 and 68', and each end section 68 and 68' terminates at a respective aperture (not specifically shown) pivotably disposed around a corresponding transverse elongate member EM and EM'.

First and second locking elements 70 and 70' such as tabs are respectively attached to adjustment lever L on each side of mower deck MD, such that first and second locking elements 70 and 70' are pivotably movable with adjustment lever L. In the illustrated embodiment, each locking element 70 and 70' is attached to a corresponding radial section 66 and 66' of adjustment lever L, although each locking element 70 and 70' could extend laterally from a corresponding end section 68 and 68' of adjustment lever L. Each locking element 70 and 70' is adapted for engaging a selected recess R and R' of a corresponding angled section 26 and 26' of frame assembly FA, thereby locking the height of frame assembly FA and thus caster wheels CW and CW' relative to mower deck MD and relative to ground G. While in the illustrated embodiment recesses R and R' of first and second angled sections 26 and 26' and adjustment lever L are disposed on the respective rearward sides of first and second angled sections 26 and 26' of frame assembly FA, recesses R and R' and adjustment lever L could alternatively be disposed on any other suitable locations such as on the forward sides of angled sections 26 and 26'. As also shown in FIGS. 3A–3C and 4, a torsion spring TS or other suitable means can be employed to bias lever L such that locking element 70 tends to pivot toward recesses R. In one embodiment, for example, torsion spring TS can be wound around elongate member EM and connected between elongate member EM and end section 68 of lever L. A second torsion spring (not shown) could be similarly provided on the other side of mower deck MD. Torsion spring TS can be used to assist in the height adjustment in mower deck MD in accordance with the operation of height adjustment apparatus HA, which will now be described.

The operation of height adjustment apparatus HA will now be described with reference being made primarily to FIGS. 3A–3C. While the operation is described in the context of lawnmower LM (see FIG. 1) of which first and second caster wheels CW and CW' mechanically communicate with its mower deck MD, as indicated hereinabove, the invention is not limited to the use of a mower deck or even a lawnmower. Moreover, the invention is not limited to the number of caster wheels employed, nor to the location of such caster wheels with respect to a mower deck, a frame, or other suitable structure.

Referring to FIG. 3A, height adjustment apparatus HA is illustrated in a locked position. The locked position is defined where locking elements 70 and 70' of adjustment lever L engage a selected pair of recesses R and R' of angled sections 26 and 26' of frame assembly FA. As shown in FIG. 3A, locking elements 70 and 70' are seated in the uppermost recesses R and R'. At this position, for the exemplary embodiment illustrated in FIG. 3A, the height of mower deck MD relative to ground G and to caster wheels CW and CW' is set to a maximum. It will be observed that recesses R and R' are formed in angled sections 26 and 26' along a direction generally orthogonal to the central axis of each angled section 26 and 26' and thus to adjustment direction AD. Hence, like adjustment direction AD and the central axis of each angled section 26 and 26', the direction of recesses R and R' is angled with respect to the vertical. Consequently, the weight of mower deck MD, and the ability of end sections 68 and 68' of adjustment lever L to pivot about corresponding transverse elongate members EM and EM', produce a selflocking torque that retains locking elements 70 and 70' in their respective recesses R and R' and prevents locking elements 70 and 70' from being unintentionally disengaged from recesses R and R'. In addition, the shape of adjustment lever L—described hereinabove in terms of transverse section 62, side sections 64 and 64', radial sections 66 and 66', end sections 68 and 68', and the transitions therebetween—permits adjustment lever L when set at the locked position to remain closely proximate to mower deck MD, with the majority of adjustment lever L being contained in the space between lateral members 20 and 20' of frame assembly FA. By this configuration, adjustment lever L is well protected from unintentional impact by any object that might jar adjustment lever L and consequently knock locking elements 70 and 70' out from their designated recesses R and R'.

Referring now to FIG. 3B, height adjustment apparatus HA is actuated to an unlocked position by grasping adjustment lever L (preferably at its central transverse section shown in FIG. 2) and lifting upwardly. By lifting adjustment lever L upwardly, the operator supports the weight of the front section of mower deck MD through its connection with adjustment lever L. As a result, the downward force of the weight of the front section of mower deck MD becomes effectively de-coupled from locking elements 70 and 70', thereby eliminating the aforementioned locking torque and permitting locking elements 70 and 70' to become unseated from recesses R and R'. Adjustment lever L is then pivoted rearwardly to the fully unlocked position shown in FIG. 3B, as indicated by arrow A, to ensure that locking elements 70 and 70' clear recesses R and R'. The rearward pivoting of adjustment lever L ensures that angled sections 26 and 26' can be translated through respective guide members GM and GM' along adjustment direction AD without locking elements 70 and 70' becoming prematurely engaged with unintended recesses R and R'. At this time, adjustment lever L can be raised or lowered as indicated by arrow B to consequently raise or lower mower deck MD relative to caster wheels CW and CW'. The raising or lowering of mower deck MD along the direction of arrow B concurs with the sliding of angled sections 26 and 26' through guide members GM and GM' along adjustment direction AD. It can be observed that the vertical orientation of swivel axles 34 and 34' is preserved throughout this height adjustment process, due to the angled orientation of angled sections 26 and 26' and guide members GM and GM'.

Referring now to FIG. 3C, the lowermost recesses R and R' of angled sections 26 and 26' have been selected for engagement with locking elements 70 and 70'. For the exemplary embodiment illustrated in FIG. 3C, this position corresponds to the minimum height at which mower deck MD can be set relative to ground G and caster wheels CW and CW'. Lowermost recesses R and R' (or any other recesses R and R') are selected by using adjustment lever L to raise or lower mower deck MD relative to angled sections 26 and 26' until locking elements 70 and 70' are in close proximity to the selected recesses R and R'. Adjustment lever L is then released by the operator. Once adjustment lever L is released, adjustment lever L will immediately pivot toward angled sections 26 and 26' as indicated by arrow C, and locking elements 70 and 70' will seat themselves into locking engagement with selected recesses R and R'. In effect, the releasing of the adjustment lever L by the operator produces the aforementioned locking torque as a result of the angled orientation of angled sections 26 and 26', the freedom of adjustment lever L to pivot about transverse elongate members EM and EM', and the force that is transferred to locking elements 70 and 70' due to the weight of mower deck MD. As described above, torsion spring TS, if provided, assists in biasing locking elements 70 and 70' into seating engagement with selected recesses R and R'.

It will be noted that the height adjustment procedure just described can be accomplished with the use of a single hand of the operator. During this procedure, the operator is required to support the weight of only the front-most section of the mower deck, and only for a few seconds. It thus can be seen that height adjustment apparatus HA disclosed herein is far less cumbersome than previously developed systems.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. An apparatus for adjusting the height of a wheel in relation to a structure, the apparatus comprising:
    (a) a wheel rotatable about a vertical axis;
    (b) a frame member attached to the wheel for connecting the wheel to a structure, the frame member comprising an angled section disposed along an adjustment direction oriented at an angle relative to the vertical axis, the angled section comprising one or more recesses along the adjustment direction;
    (c) a hollow guide member attached to the structure, the guide member disposed at least partially around the angled section and having an interior oriented along the adjustment direction, the angled section being movable through the guide member along the adjustment direction; and
    (d) a lever pivotable in relation to the guide member and comprising a locking element for engaging a selected recess to enable fixation of the angled section at a desired position relative to the guide member.

2. The apparatus according to claim 1 wherein the frame member comprises a support section attached to the wheel.

3. The apparatus according to claim 2 wherein the support section adjoins the angled section and is disposed in angled relation to the angled section.

4. The apparatus according to claim 2 comprising a wheel housing supported by the support section, wherein the wheel comprises a horizontal axle rotatably connected to the wheel housing, the support section comprises an axle bore and a vertical axle rotatably disposed therein, the vertical axle is attached to the wheel housing, and the vertical axle and wheel housing are rotatable with the wheel about the vertical axis.

5. The apparatus according to claim 1 comprising a transverse element for attachment to the structure and wherein the lever is pivotably connected to the transverse element.

6. The apparatus according to claim 5 wherein the transverse element is connected to the guide member for attaching the guide member to the structure.

7. The apparatus according to claim 1 wherein the angled section comprises first and second stop members axially spaced along the adjustment direction for constraining movement of the angled section through the guide member between the first and second stop members.

8. The apparatus according to claim 7 comprising a transverse element for attachment to the structure and wherein the lever is pivotably connected to the transverse element.

9. The apparatus according to claim 8 wherein the angled section defines a slot formed along the adjustment direction, the first and second stop members comprise respective first and second slot ends of the slot, the transverse element transversely extends through the slot, and movement of the angled section through the guide member is limited by contact of the transverse element alternately with the first and second slot ends.

10. The apparatus according to claim 8 wherein the angled section has a groove formed along the adjustment direction, the first and second stop members comprise respective first and second groove ends of the groove, the transverse element is slidable along the groove between the first and second groove ends, and movement of the angled section through the guide member is limited by contact of the transverse element alternately with the first and second groove ends.

11. The apparatus according to claim 7 wherein the first and second stop members comprise respective first and second stop surfaces protruding from the angled section, the guide member comprises first and second opposing guide ends, and movement of the angled section through the guide member is limited by contact of the first and second guide ends with the first and second stop surfaces, respectively.

12. An apparatus for adjusting the height of a caster wheel in relation to a structure, comprising:
   (a) a caster wheel rotatable about a vertical axis;
   (b) a frame member attached to the caster wheel for connecting the caster wheel to a structure, the frame member comprising an angled section disposed along an adjustment direction oriented at an angle relative to the vertical axis, the angled section defining a slot disposed along the adjustment direction and a plurality of spaced recesses serially arranged along the adjustment direction;
   (c) a hollow guide member for attachment to the structure, the guide member disposed at least partially around the angled section and having an interior oriented along the adjustment direction, the angled section being movable through the guide member along the adjustment direction;
   (d) an elongate element transversely extending through the slot and alternately contactable with first and second opposing slot ends of the slot, wherein the first and second slot ends limit movement of the angled section relative to the guide member; and
   (e) a lever pivotably connected to the elongate element and comprising a locking element for engaging a selected one of the recesses to enable fixation of the angled section at a desired position relative to the guide member.

13. The apparatus according to claim 12 wherein the frame member comprises a support section attached to the caster wheel.

14. The apparatus according to claim 13 wherein the support section adjoins the angled section and is disposed in angled relation to the angled section.

15. The apparatus according to claim 13 comprising a wheel housing supported by the support section, and wherein the caster wheel comprises a horizontal axle rotatably connected to the wheel housing, the support section comprises an axle bore and a vertical axle rotatably disposed therein, the vertical axle is attached to the wheel housing, and the vertical axle and wheel housing are rotatable with the caster wheel about the vertical axis.

16. The apparatus according to claim 12 wherein the elongate element is connected to the guide member for attaching the guide member to the structure.

17. The apparatus according to claim 12 comprising a torsion spring connected between the lever and the elongate element for biasing the locking element toward the recesses.

18. An apparatus for adjusting the height of a caster wheel in relation to a structure, comprising:
   (a) first and second caster wheels rotatable about respective parallel vertical axes;
   (b) a first frame member attached to the first caster wheel for connecting the first caster wheel to a structure, the first frame member comprising a first angled section disposed along an adjustment direction oriented at an angle relative to the vertical axes, the first angled section comprising a pair of first stop members axially spaced along the adjustment direction and a plurality of first recesses serially arranged along the adjustment direction;
   (c) a second frame member attached to the second caster wheel for connecting the second caster wheel to the structure, the second frame member comprising a second angled section disposed along the adjustment direction, the second angled section comprising a pair of second stop members axially spaced along the adjustment direction and a plurality of second recesses serially arranged along the adjustment direction;
   (d) a transverse frame member interconnecting the first and second frame members;
   (e) first and second hollow guide members for attachment to the structure, each guide member disposed at least partially around a respective angled section and having an interior oriented along the adjustment direction, each angled section being movable through a respective guide member along the adjustment direction and movement of the angled sections is constrained between the respective pairs of first and second stop members; and
   (f) a lever pivotable in relation to the first and second guide members, the lever comprising first and second locking elements for respectively engaging a selected first recess and second recess to enable fixation of the first and second angled sections at a desired height relative to the first and second guide members.

19. The apparatus according to claim 18 wherein each frame member comprises a support section attached to a respective caster wheel.

20. The apparatus according to claim 19 wherein each support section adjoins its corresponding angled section and is disposed in angled relation to the angled section.

21. The apparatus according to claim 19 comprising a first and second wheel housings respectively supported by the first and second support sections, and wherein each caster wheel comprises a horizontal axle rotatably connected to its respective wheel housing, each support section comprises an axle bore and a vertical axle rotatably disposed therein, each vertical axle is attached to its respective wheel housing, and each corresponding vertical axle, wheel housing and caster wheel are rotatable about their corresponding vertical axes.

22. The apparatus according to claim 21 comprising first and second transverse elements for attachment to the structure, wherein the lever is pivotably connected to and extends between the first and second transverse elements.

23. The apparatus according to claim 22 wherein each transverse element is connected to its corresponding guide member for attaching the guide member to the structure.

24. The apparatus according to claim 22 wherein each angled section has a slot formed along the adjustment direction, each pair of stop members of each angled section comprise a pair of slot ends of the corresponding slot, each transverse element transversely extends through its corresponding slot, and movement of the first and second angled sections through their respective guide members is limited by contact of each transverse element alternately with its corresponding slot ends.

25. The apparatus according to claim 22 wherein each angled section has a groove formed along the adjustment direction, each pair of stop members of each angled section comprise a pair of groove ends of the corresponding groove, each transverse element rides along its corresponding groove between the groove ends, and movement of the first and second angled sections through their respective guide members is limited by contact of each transverse element alternately with its corresponding groove ends.

26. The apparatus according to claim 18 wherein each pair of stop members comprise a respective pair of stop surfaces protruding from a respective angled section, each guide member comprises a pair of opposing guide ends, and movement of the first and second angled sections through their respective guide members is limited by contact of each pair of guide ends with their corresponding stop surfaces, respectively.

27. A mobile apparatus movable along a ground surface and adapted for height adjustment relative to the ground surface, comprising:
(a) a set of wheels, wherein at least one of the wheels is a wheel rotatable about a vertical axis;
(b) a structure supported at least partially by the set of wheels;
(c) a frame member interconnecting the wheel and the structure, the frame member comprising an angled section disposed along an adjustment direction oriented at an angle relative to the vertical axis, the angled section comprising one or more recesses along the adjustment direction;
(d) a hollow guide member attached to the structure, the guide member disposed at least partially around the angled section and having an interior oriented along the adjustment direction, wherein the angled section is movable through the guide member along the adjustment direction; and
(e) a handle pivotable in relation to the guide member and comprising a locking element for engaging a selected recess to enable fixation of a height of the structure relative to the wheel.

28. The apparatus according to claim 27 wherein the structure is a lawnmower.

29. The apparatus according to claim 27 wherein the structure is a mower deck for housing cutting blades.

30. The apparatus according to claim 27 comprising a transverse element attached to the structure, wherein the handle is pivotably connected to the transverse element.

31. The apparatus according to claim 27 wherein the angled section comprises first and second stop members axially spaced along the adjustment direction for constraining movement of the angled section through the guide member between the first and second stop members.

32. The apparatus according to claim 31 comprising a transverse element for attachment to the structure and wherein the lever is pivotably connected to the transverse element.

33. The apparatus according to claim 32 wherein the angled section defines a slot formed along the adjustment direction, the first and second stop members comprise respective first and second slot ends of the slot, the transverse element transversely extends through the slot, and movement of the angled section through the guide member is limited by contact of the transverse element alternately with the first and second slot ends.

34. The apparatus according to claim 32 wherein the angled section has a groove formed along the adjustment direction, the first and second stop members comprise respective first and second groove ends of the groove, the transverse element rides along the groove between the first and second groove ends, and movement of the angled section through the guide member is limited by contact of the transverse element alternately with the first and second groove ends.

35. The apparatus according to claim 31 wherein the first and second stop members comprise respective first and second stop surfaces protruding from the angled section, the guide member comprises first and second opposing guide ends, and movement of the angled section through the guide member is limited by contact of the first and second guide ends with the first and second stop surfaces, respectively.

36. A method for adjusting the height of a wheel relative to a structure, comprising the steps of:
(a) grasping a lever initially locked in engagement with a first recess of an angled section of a frame supporting a wheel, wherein the lever is pivotable relative to a hollow guide member attached to a structure, the guide member and angled section being oriented along an adjustment direction angled relative to a ground surface on which the wheel is disposed, and the angled section extending through the guide member;
(b) pivoting the lever out of engagement with the first recess and to an unlocked position while using the lever to support a weight of at least a portion of the structure, wherein the angled section is freely slidable through the guide member along the adjustment direction;
(c) selecting a second recess of the angled section spaced from the first recess at a distance generally along the adjustment direction;
(d) sliding the angled section through the guide member to an adjusted position corresponding to a new height of the wheel relative to the structure by moving the lever along a vertical direction generally perpendicular to the ground surface; and
(e) locking the angled section at the adjusted position by releasing the lever, wherein the angled orientation of the angled section and guide member and the weight of at least the portion of the structure cooperatively cause the lever to pivot into locked engagement with the selected second recess.

37. The method according to claim 36 wherein the angled section has a slot formed along the adjustment direction between first and second slot ends, a transverse element transversely extends through the slot, and movement of the angled section through the guide member is limited by contact of the transverse element alternately with the first and second slot ends.

38. The method according to claim 36 wherein the angled section has a groove formed along the adjustment direction between first and second groove ends, a transverse element is slidable along the groove between the first and second groove ends, and movement of the angled section through the guide member is limited by contact of the transverse element alternately with the first and second groove ends.

39. The method according to claim 36 wherein the angled section comprises first and second stop surfaces spaced along an axial length of the angled section, the guide member comprises first and second opposing guide ends, and movement of the angled section through the guide member is limited by contact of the first and second guide ends with the first and second stop surfaces, respectively.

* * * * *